United States Patent [19]
Eyman et al.

[11] Patent Number: 6,155,579
[45] Date of Patent: Dec. 5, 2000

[54] FOLDING CHILD STROLLER AND FRAME CARRIER

[75] Inventors: David W. Eyman; Jennifer A. Kelley; Thomas J. Schmidlin, all of Cincinnati, Ohio

[73] Assignee: InSTEP LLC

[21] Appl. No.: 09/209,034

[22] Filed: Dec. 10, 1998

[51] Int. Cl.[7] .................................................. B62B 7/08
[52] U.S. Cl. ............................ 280/30; 280/643; 280/648; 280/47.25
[58] Field of Search ............................... 280/1.5, 30, 641, 280/642, 643, 644, 647, 658, 47.371; 297/329, 330; 224/155, 161, 157

[56] References Cited

U.S. PATENT DOCUMENTS

| | | |
|---|---|---|
| D. 204,254 | 4/1966 | Cerf . |
| D. 206,116 | 11/1966 | Hughes . |
| D. 274,714 | 7/1984 | Cone . |
| D. 290,825 | 7/1987 | Mathies et al. . |
| D. 297,525 | 9/1988 | Baechler . |
| D. 301,850 | 6/1989 | Clement et al. . |
| D. 315,885 | 4/1991 | Jacobs . |
| D. 356,761 | 3/1995 | Jacobs et al. . |
| D. 357,438 | 4/1995 | Hsia . |
| D. 362,832 | 10/1995 | Haut et al. . |
| D. 363,260 | 10/1995 | Huang . |
| D. 370,438 | 6/1996 | Haut et al. . |
| D. 381,297 | 7/1997 | Eyman et al. . |
| 699,186 | 5/1902 | Katzke . |
| 716,972 | 12/1902 | Whitmore . |
| 2,425,688 | 8/1947 | Schulte . |
| 2,455,119 | 11/1948 | Hall . |
| 2,781,255 | 2/1957 | Heideman . |
| 3,052,480 | 9/1962 | Sanstrom . |
| 3,110,504 | 11/1963 | Myers . |
| 3,403,744 | 10/1968 | Dinkel . |

(List continued on next page.)

FOREIGN PATENT DOCUMENTS

| | | |
|---|---|---|
| 589480 | 3/1994 | European Pat. Off. . |
| 2579544 | 10/1986 | France . |
| 213538 | 4/1908 | Germany . |
| 2348716 | 7/1974 | Germany . |
| 2741543 | 6/1978 | Germany . |
| 3435575 | 4/1986 | Germany . |
| 851163 | 10/1960 | United Kingdom . |
| 2099765 | 12/1982 | United Kingdom . |
| 2204282 | 11/1988 | United Kingdom . |

OTHER PUBLICATIONS

Cannondale Bicycle Trailer Seat Oct. 10, 1990.

*Primary Examiner*—Brian L. Johnson
*Assistant Examiner*—Bridget Avery
*Attorney, Agent, or Firm*—Gerald E. Helget; Rider, Bennett, Egan & Arundel

[57] ABSTRACT

A folding child stroller and frame carrier convertible by using only one hand between use as a ground-contacting four-wheel stroller and use as a frame carrier for carrying a child on a person's back, consists of a front frame portion having a front end supporting at least two front wheels, a rear frame portion having a rear end supporting at least two rear wheels, a flexible child holder attached to the front frame portion, the rear frame portion pivotally connected to the front frame portion at a pivot point and movable between an extended position in which the rear end is substantially separated from the front end and a contracted position in which the rear end is adjacent the front end, a handle portion connected to the front frame portion and pivotable downwardly and forwardly using only one hand from an extended position in which the handle portion is substantially in-line with the front frame portion and a folded position in which the handle portion is adjacent to the rear frame portion, and an actuating strut exerting a force on the rear frame portion at a point intermediate the rear end and the pivot point to move the rear end toward the front end as the handle portion is pivoted downwardly and forwardly, and the actuating strut attached to the handle portion at a fixed distance from the front frame portion and pivoting on the handle portion.

45 Claims, 6 Drawing Sheets

U.S. PATENT DOCUMENTS

| | | |
|---|---|---|
| 3,575,461 | 4/1971 | Goldman et al. . |
| 3,605,929 | 9/1971 | Rolland . |
| 3,656,777 | 4/1972 | Keiser, Jr. . |
| 3,698,502 | 10/1972 | Patin . |
| 3,712,636 | 1/1973 | Gesslein . |
| 3,781,031 | 12/1973 | Patin . |
| 3,848,890 | 11/1974 | MacAlpine . |
| 3,873,116 | 3/1975 | Perego . |
| 3,877,723 | 4/1975 | Fahey . |
| 3,909,043 | 9/1975 | Black . |
| 3,984,115 | 10/1976 | Miller . |
| 4,029,329 | 6/1977 | Chambers . |
| 4,064,957 | 12/1977 | Parham . |
| 4,072,318 | 2/1978 | Laune . |
| 4,157,837 | 6/1979 | Kao . |
| 4,166,630 | 9/1979 | Sullivan et al. . |
| 4,181,317 | 1/1980 | Toda . |
| 4,325,449 | 4/1982 | D'Addio et al. . |
| 4,335,900 | 6/1982 | Fleischer . |
| 4,346,912 | 8/1982 | Habib . |
| 4,353,567 | 10/1982 | Weldy . |
| 4,361,338 | 11/1982 | Kuchenbecker et al. . |
| 4,369,987 | 1/1983 | Witherell . |
| 4,373,740 | 2/1983 | Hendrix . |
| 4,403,673 | 9/1983 | Ball . |
| 4,408,776 | 10/1983 | Randolph et al. . |
| 4,422,663 | 12/1983 | Hon . |
| 4,526,390 | 7/1985 | Skolnik . |
| 4,542,915 | 9/1985 | Wheeler, III et al. . |
| 4,548,423 | 10/1985 | Craven . |
| 4,586,721 | 5/1986 | Harada et al. . |
| 4,606,550 | 8/1986 | Cone . |
| 4,618,184 | 10/1986 | Harvey . |
| 4,620,711 | 11/1986 | Dick .............................................. 280/30 |
| 4,632,420 | 12/1986 | Miyagi . |
| 4,718,715 | 1/1988 | Ho ............................................... 297/32 |
| 4,741,551 | 5/1988 | Perego . |
| 4,747,526 | 5/1988 | Launes .................................... 224/155 |
| 4,756,541 | 7/1988 | Albitre . |
| 4,762,256 | 8/1988 | Whitaker .................................. 224/161 |
| 4,768,795 | 9/1988 | Mar ............................................. 280/30 |
| 4,828,278 | 5/1989 | Nakao et al. . |
| 4,831,689 | 5/1989 | Lo . |
| 4,902,027 | 2/1990 | Skelly . |
| 4,915,401 | 4/1990 | Severson . |
| 4,928,985 | 5/1990 | Nowlin . |
| 4,934,728 | 6/1990 | Chen . |
| 4,953,880 | 9/1990 | Sudakoff et al. . |
| 4,993,743 | 2/1991 | Takahashi et al. . |
| 5,029,891 | 7/1991 | Jacobs . |
| 5,039,120 | 8/1991 | Stowe . |
| 5,076,599 | 12/1991 | Lockett et al. . |
| 5,087,066 | 2/1992 | Mong-Hsing . |
| 5,123,670 | 6/1992 | Chen . |
| 5,133,567 | 7/1992 | Owens . |
| 5,176,395 | 1/1993 | Garforth-Bles . |
| 5,205,577 | 4/1993 | Liu . |
| 5,207,439 | 5/1993 | Mortenson . |
| 5,224,720 | 7/1993 | Chaw et al. . |
| 5,242,178 | 9/1993 | Galasso et al. . |
| 5,257,799 | 11/1993 | Cone et al. . |
| 5,259,634 | 11/1993 | Berner et al. . |
| 5,265,891 | 11/1993 | Diehl . |
| 5,301,963 | 4/1994 | Chen . |
| 5,308,096 | 5/1994 | Smith . |
| 5,356,171 | 10/1994 | Schmidlin et al. . |
| 5,364,119 | 11/1994 | Leu . |
| 5,421,597 | 6/1995 | Berner . |
| 5,431,478 | 7/1995 | Noonan ..................................... 297/130 |
| 5,460,395 | 10/1995 | Chen . |
| 5,503,430 | 4/1996 | Miki et al. . |
| 5,522,614 | 6/1996 | Eyman et al. . |
| 5,538,267 | 7/1996 | Pasin et al. . |
| 5,553,759 | 9/1996 | McMaster et al . ..................... 224/631 |
| 5,590,896 | 1/1997 | Eichhorn . |
| 5,599,033 | 2/1997 | Kolbus et al. . |
| 5,662,339 | 9/1997 | Svendsen et al. ......................... 280/30 |
| 5,769,431 | 6/1998 | Cordova .................................... 280/1.5 |
| 5,964,470 | 10/1999 | Syendsen et al. ........................ 280/30 |

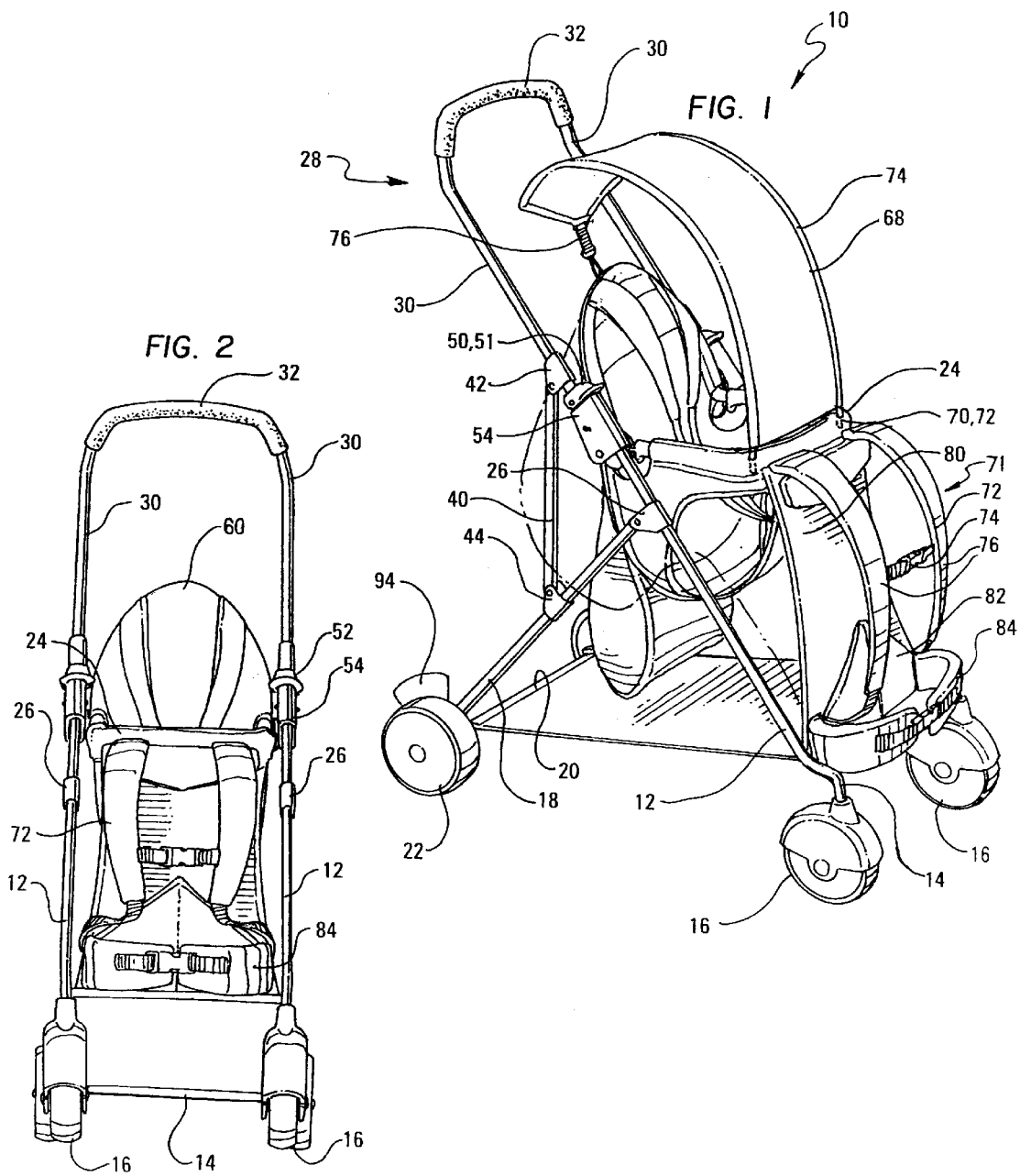

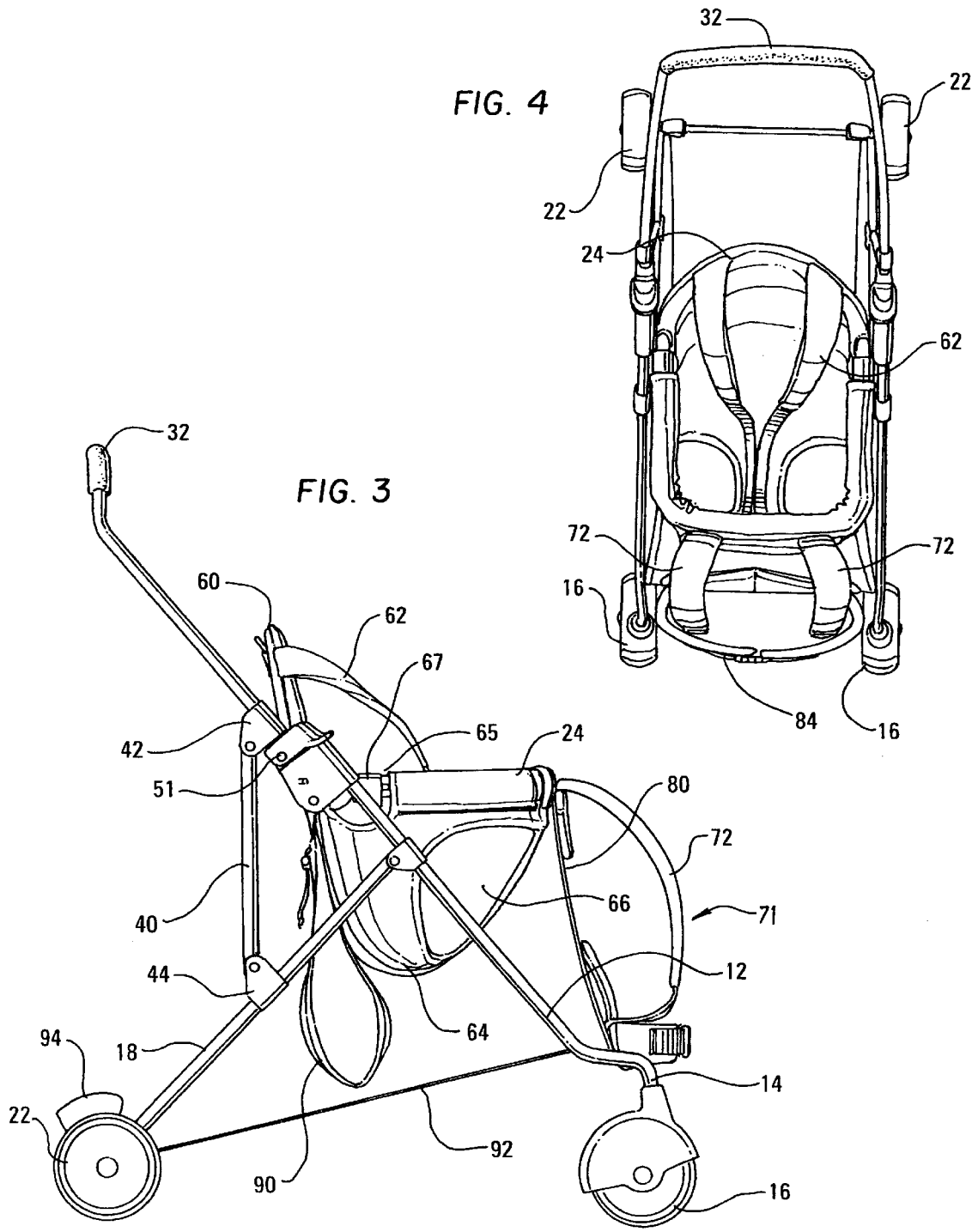

FOLDING CHILD STROLLER AND FRAME CARRIER

BACKGROUND OF THE INVENTION

The present invention relates to a folding child stroller that may be converted between a ground-contacting four-wheeled stroller and a frame carrier for carrying a child on a person's back.

Collapsible or foldable baby carriages for walking have long been known and are generally described in U.S. Pat. Nos. 2,781,225; 3,873,116; and 4,072,318. These early carriages have evolved from more cumbersome, rigid carriages, as many carriages are now collapsible or foldable as to make them conveniently transported or stored.

The problems associated with known collapsible or foldable baby carriages or strollers are well known. For such strollers to be safe and permit smooth carrying of an infant, they must be secured together safely, such as with the use of bolts and nuts. Consequently, the disassembly of such strollers is required, necessitating the use of tools to break the stroller partially down to permit collapse or folding. Furthermore, many of these carriages or infant strollers, when in their collapsed or folded state, have one or two of their three dimensions actually extended to a longer length, height or width than when the strollers are erect. This extensibility or expansion of one or two dimensions, however, has been acceptable as the strollers were at least able to fit into trunks of automobiles and the like which permitted elongated folded frames.

With the resurgence of physical fitness, persons of all ages, including the parents of infants and young children, have developed great interest in all forms of physical exercise, particularly in jogging and walking at relatively high speeds. Consequently, infant jogging strollers or carriages that fold for transport or storage, while yet provide for safe, stable and secure carrying of a child at a relatively higher speed were developed. Several of these infant jogging strollers are shown in U.S. Pat. Nos. Des. 297,525; 4,934,728; 4,953,880; Des 315,885; and 5,029,891. However, these jogging strollers are also plagued with the problem of frame elongation upon collapse or folding for transportation and/or storage.

In addition to the ability to fold a jogging stroller for transport in an automobile, today's active parents demand a jogging stroller that can be folded to a compact configuration for use as a baby carrier, or frame carrier, for carrying the child on the parent's back. Such a device has the highest demands for a compact, folded configuration while at the same time providing safe, stable transport of the child in a stroller configuration while walking or jogging.

In addition, a convertible stroller/frame carrier must be convertible from the stroller configuration to the frame carrier configuration by using only one hand and without bracing the device with the feet, because parents often must hold the infant in one hand and must have both feet firmly on the ground to avoid the chance of a slip and fall while holding the infant. Additionally, the convertible stroller/frame carrier should be collapsible to a partially collapsed configuration in which the device may be mounted on the parent's back while still being self-supporting, as on a picnic table, and then convertible to the fully collapsed frame carrier configuration with only one hand.

Stroller/backpack configurations are known, as shown in U.S. Pat. Nos. 4,915,401; 4,586,721; 3,984,115; 4,157,837; and Des. 357,438. However, these devices do not fully meet the need for true one-handed convertibility as described above.

There is thus a need for a convertible stroller/frame carrier with true one-handed convertibility and partial collapsibility.

SUMMARY OF THE INVENTION

A folding child stroller and frame carrier convertible by using only one hand between use as a ground-contacting four-wheel stroller and use as a frame carrier for carrying a child on a person's back, consists of a front frame portion having a front end supporting at least two front wheels, a rear frame portion having a rear end supporting at least two rear wheels, a flexible child holder attached to the front frame portion, the rear frame portion pivotally connected to the front frame portion at a pivot point and movable between an extended position in which the rear end is substantially separated from the front end and a contracted position in which the rear end is adjacent the front end, a handle portion connected to the front frame portion and pivotable downwardly and forwardly using only one hand from an extended position in which the handle portion is substantially in-line with the front frame portion and a folded position in which the handle portion is adjacent to the rear frame portion, and an actuating strut exerting a force on the rear frame portion at a point intermediate the rear end and the pivot point to move the rear end toward the front end as the handle portion is pivoted downwardly and forwardly, and the actuating strut attached to the handle portion at a fixed distance from the front frame portion and pivoting on the handle portion.

A principal object and advantage of the present invention is that it is convertible between a stroller configuration in which the child is held safely in the stroller as the stroller is pushed along the ground and a frame carrier configuration in which the child is safely held on a person's back.

Another object and advantage of the present invention is that it is convertible from the stroller configuration to the frame carrier configuration using only one hand while the person's feet are firmly planted on the ground, thus allowing the child to be held and avoiding the risk of a slip and fall.

Another object and advantage of the present invention is that it can be placed in a partially collapsed configuration so that a person may put the frame carrier on his back and then fully collapse the device by pulling on the handle.

BRIEF DESCRIPTION OF THE DRAWINGS

FIG. 1 is a right-side perspective view of the folding stroller/frame carrier of the present invention, with an alternate position for the child holder shown in phantom.

FIG. 2 is a front elevational view of the folding stroller/frame carrier of the present invention.

FIG. 3 is a right-side elevational view of the folding stroller/frame carrier of the present invention.

FIG. 4 is a top plan view of the folding stroller/frame carrier of the present invention.

DETAILED DESCRIPTION OF THE PREFERRED EMBODIMENTS

Figure 5:
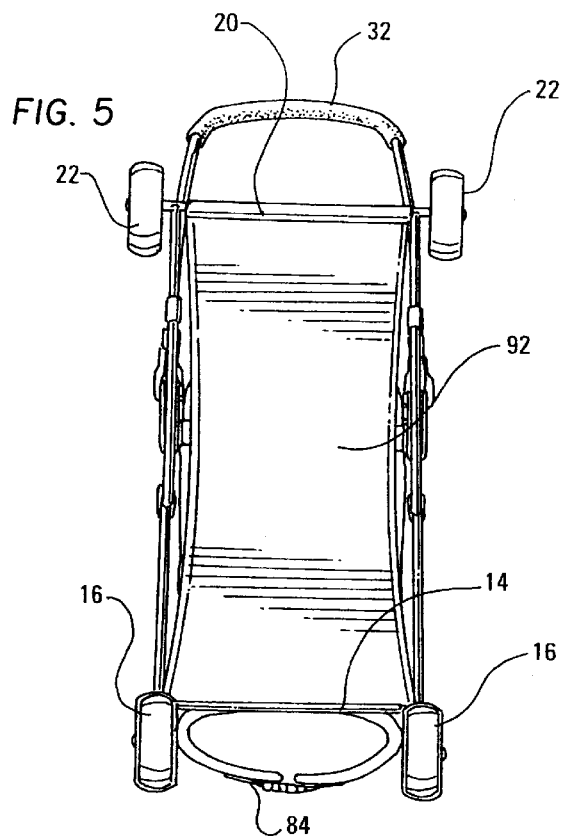
FIG. 5 is a bottom plan view of the folding stroller/frame carrier of the present invention.

The folding child stroller and frame carrier of the present invention is generally shown in the Figures as reference numeral 10.

The folding child stroller and frame carrier 10 comprises a front frame portion 12 having a front end 14 supporting at least two front wheels 16; a rear frame portion 18 having a rear end 20 supporting at least two rear wheels 22; and a flexible child holder 24 attached to the front frame portion 12.

The rear frame portion 18 is pivotally connected to the front frame portion 12 at a pivot point 26. The rear frame portion 18 is movable between an extended position (shown in FIG. 1) in which the rear end 20 is substantially separated from the front end 14 and a contracted position (shown in FIG. 9) in which the rear end 20 is adjacent the front end 14.

A handle portion 28 is connected to the front frame portion 12 and is pivotable downwardly using only one hand from an extended position (FIG. 1) in which the handle portion 28 is substantially in-line with the front frame portion 12 and a folded position (FIG. 9) in which the handle portion 28 is adjacent the rear frame portion 18. The handle portion 28 preferably further comprises a pair of handle frame members 30 connected together by a grip 32. No other part of the operator's body needs to come into contact with the stroller/frame carrier 10 to fold the handle as described.

Figure 9:
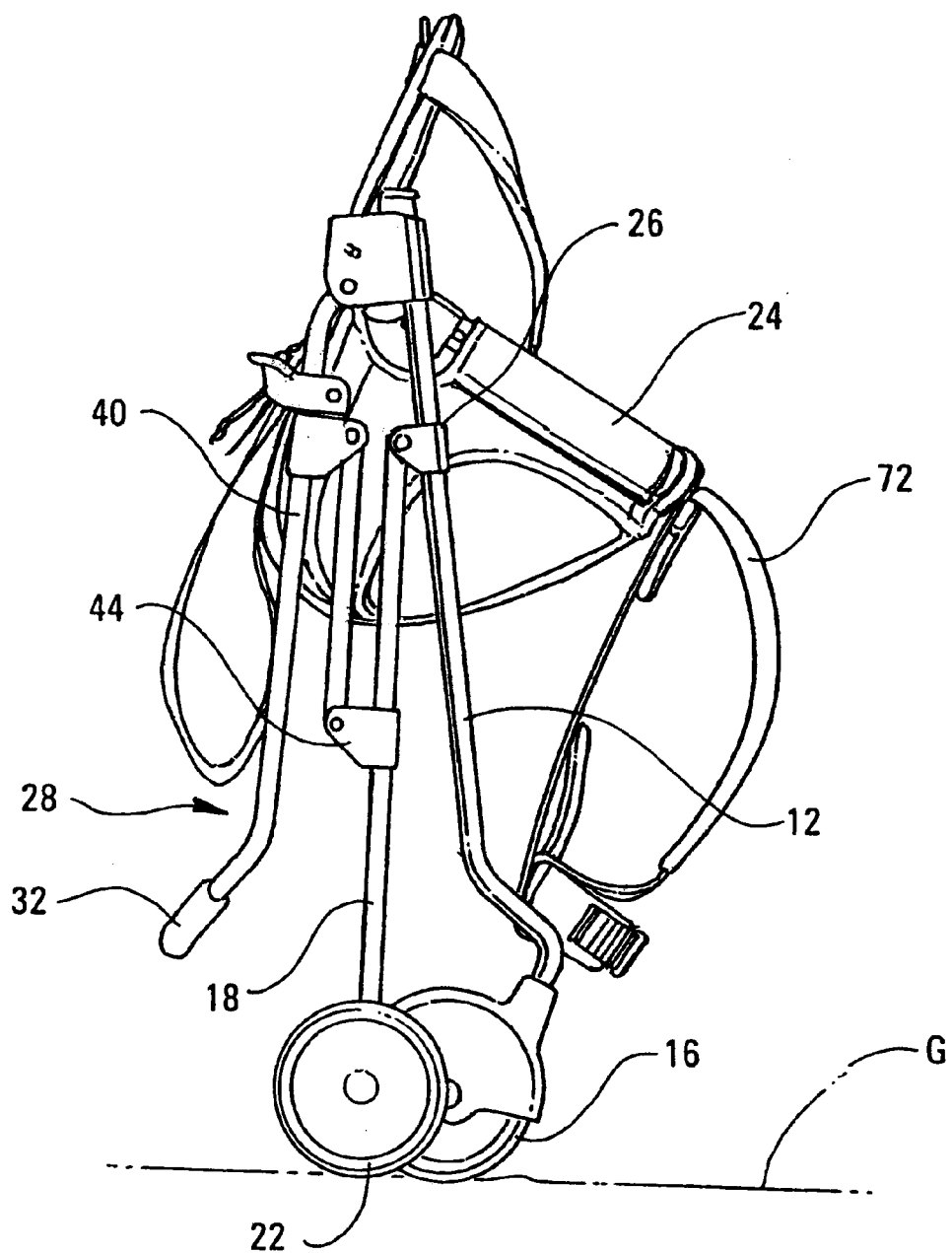

An actuating strut 40 is attached to the handle portion 28 at an activating strut/handle pivot point 42 at a fixed distance from the front frame portion 12 and pivots on the handle portion. The actuating strut 40 exerts a force on the rear frame portion 18 at a point intermediate the rear end 20 and the pivot point 26 to move the rear end 20 toward the front end 14 as the handle portion 28 is pivoted downwardly and forwardly. At the same time, the activating strut also pivots on the rear frame portion 28 at an activating strut/rear frame pivot point 44 and thereby folds up to lie against the rear frame portion 18 (FIG. 9). Because the actuating strut 40 is linked to the handle portion 28, this collapsing operation may occur with the operator using only one hand and no other body part such as another hand or foot to brace the stroller/frame carrier 10. Unlike other devices, the activating strut 40 does not slide along the front frame portion 12, so that the full mechanical advantage of the distance of the activating strut/handle point 42 from the front frame portion 12 is maintained during the folding operation.

The stroller/frame carrier 10 may also include a releasable locking means 50 adapted to secure the stroller/frame carrier 10 in the extended position (FIG. 1) for use as a stroller. In the preferred embodiment, the releasable locking means 50 comprises a cap 51 which pivots on the handle portion 28 and contacts a bracket 54 on the front frame portion 12 to prevent the handle portion 28 from folding. However, any equivalent locking means such as a bolt, screw, or wing nut could also be used. It will be noted that each cap 51 is releasable using only one hand.

Details of the flexible child holder 24 are visible in FIG. 3, where it will be seen that the flexible child holder 24 further comprises a back rest 60; a harness 62 adapted to secure the child to the child holder 24; and a seat portion 64 with leg holes 66 for receiving the child's legs.

As shown in FIG. 1, the child holder 24 is preferably adapted to be moved from its extended position (solid lines) to a position substantially parallel to the front frame portion 12 (phantom lines) for permanent storage of the f old ing child stroller/frame carrier 10.

To accomplish this function, the child holder 24 is preferably supported on a support rod 65 sewn into the fabric of the seat portion 64 and pivotable on the front frame portion 12. A second releasable locking means 67 holds the child holder 24 substantially horizontal when in use.

As shown in FIG. 9, the child holder 24 is preferably attached to the front frame portion 12 at angle such that the child holder 24 is canted slightly downwardly when the stroller/frame carrier is in the contracted position. This ensures that the child will rest firmly against the person's back with no tendency to tip backwards. The angle may preferably be in the range 20° to 40°.

Optionally, a rain/sun shield 68 may attach to the flexible child holder 24 at the back rest 60 and at the seat portion 64, as shown in FIG. 1. Preferably, the rain/sun shield 68 has a pair of pins 70 mating with holes 72 in the seat portion 64; a pair of flexible rods 74 sewn into the fabric of the rain/sun shield 68; and a strap attachment 76 for hooking onto the back rest 60. The resulting curved shape of the rain/sun shield 68 protects the child against rain, wind, and sun coming either from the front of the stroller or from above the stroller.

Figure 6:
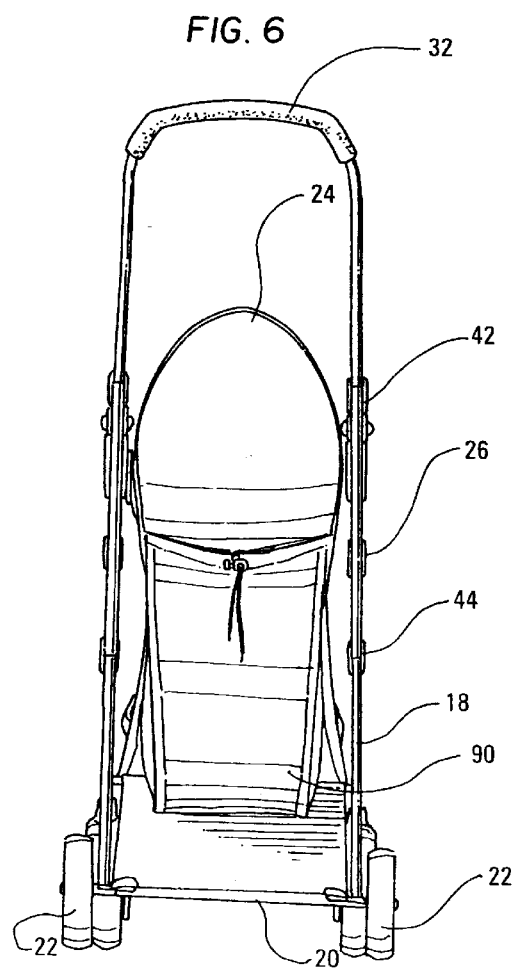
FIG. 6 is a rear elevational view of the folding stroller/frame carrier of the present invention.

Details of the frame carrier 71 are visible, particularly in FIGS. 1, 3 and 6. The frame carrier 71 comprises a pair of padded, adjustable shoulder straps 72 which are secured between the child holder 24 and the front end 14. An adjustable sternum strap 74 is adapted to connect the two shoulder straps 72 together across the person's chest. Preferably, a sternum strap retainer 76 slidably connects the sternum strap 74 to each shoulder strap 72, so that the sternum strap may be adjusted vertically along the shoulder straps 72. A breathable mesh back pad 80 is attached to the child holder 24 and the front end 14. A lower back cushion 82 is connected to the back pad 80 to support the person's lower back. A padded, adjustable waist belt 84 is attached to the lower back cushion 82 to support the stroller/frame carrier at the person's waist.

Optionally, a pouch 90 may be attached to the seat 64 of the child holder 24 for storing articles such as diapers.

Preferably, the stroller/frame carrier 10 further comprises a flexible brace 92 such as piece of fabric connecting the rear end 20 to the front end 14 to limit the separation of the front end 14 from the rear end 20, so that the stroller does not overextend.

Releasable wheel locks 94 attached to the rear wheels 22 keep the stroller from moving along the ground.

Figure 7:
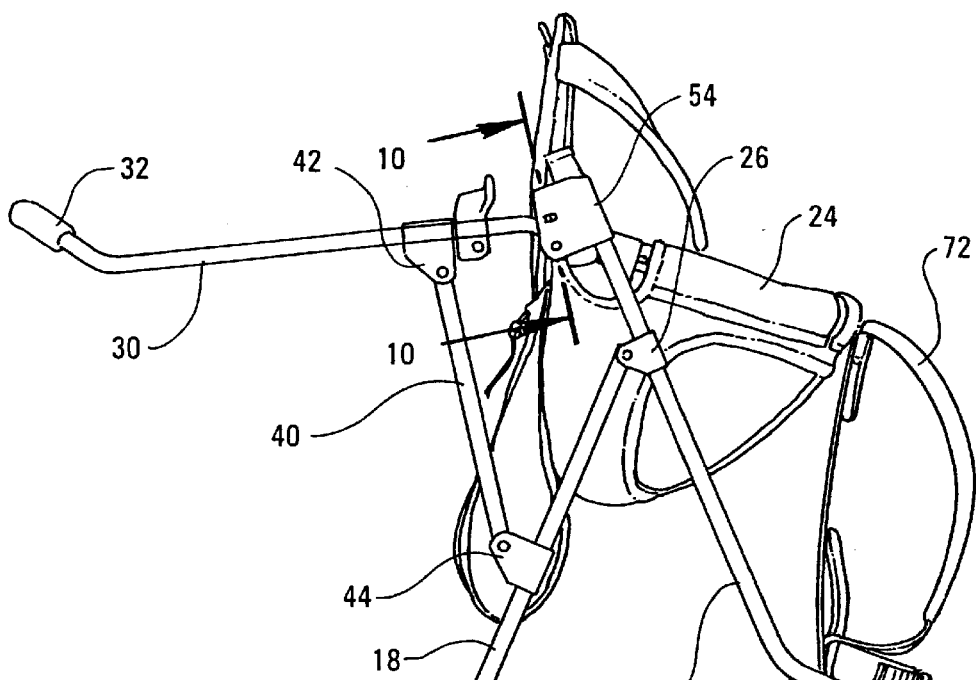
FIGS. 7–9 are left-side elevational views of the folding stroller/frame carrier of the present invention showing the process of converting the invention between the stroller configuration and the frame carrier configuration.
Figure 10:
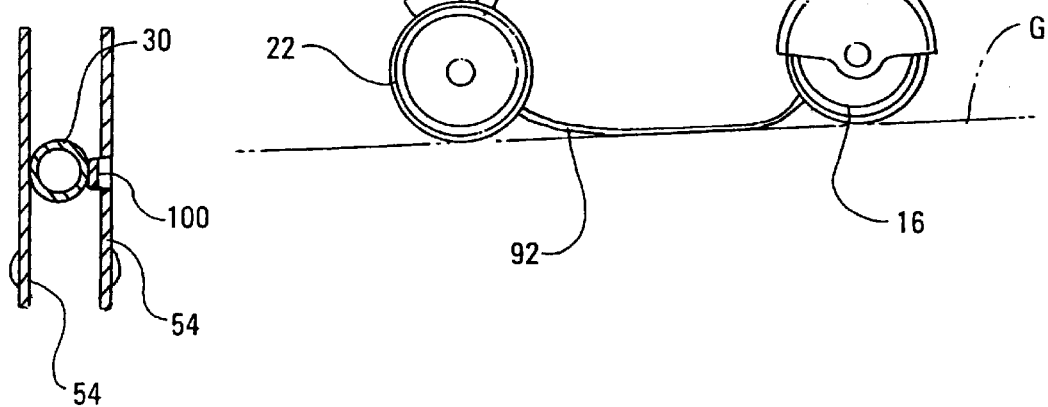
FIG. 10 is a cross-section along the lines 10 of FIG. 7.

A novel and very useful feature of the stroller/frame carrier 10 is a detent adapted to hold the stroller/frame carrier in a partially contracted position (as seen in FIG. 7) so that a person may put the frame carrier 10 on his back and then reach behind the child holder 24 to pull the handle portion 28 downwardly, thereby moving the stroller/frame carrier 10 to the contracted position (seen in FIG. 9). For example, the stroller/frame carrier 10 could be placed on a picnic bench, put into the partially contracted position, and then put on the person's back. As best seen in FIG. 10, the detent 100 is preferably placed on the inside of the bracket 54 at the top end of the front frame portion 12, so that the detent 100 engages the handle frame member 30 as the handle is pulled downwardly.

Figure 8:
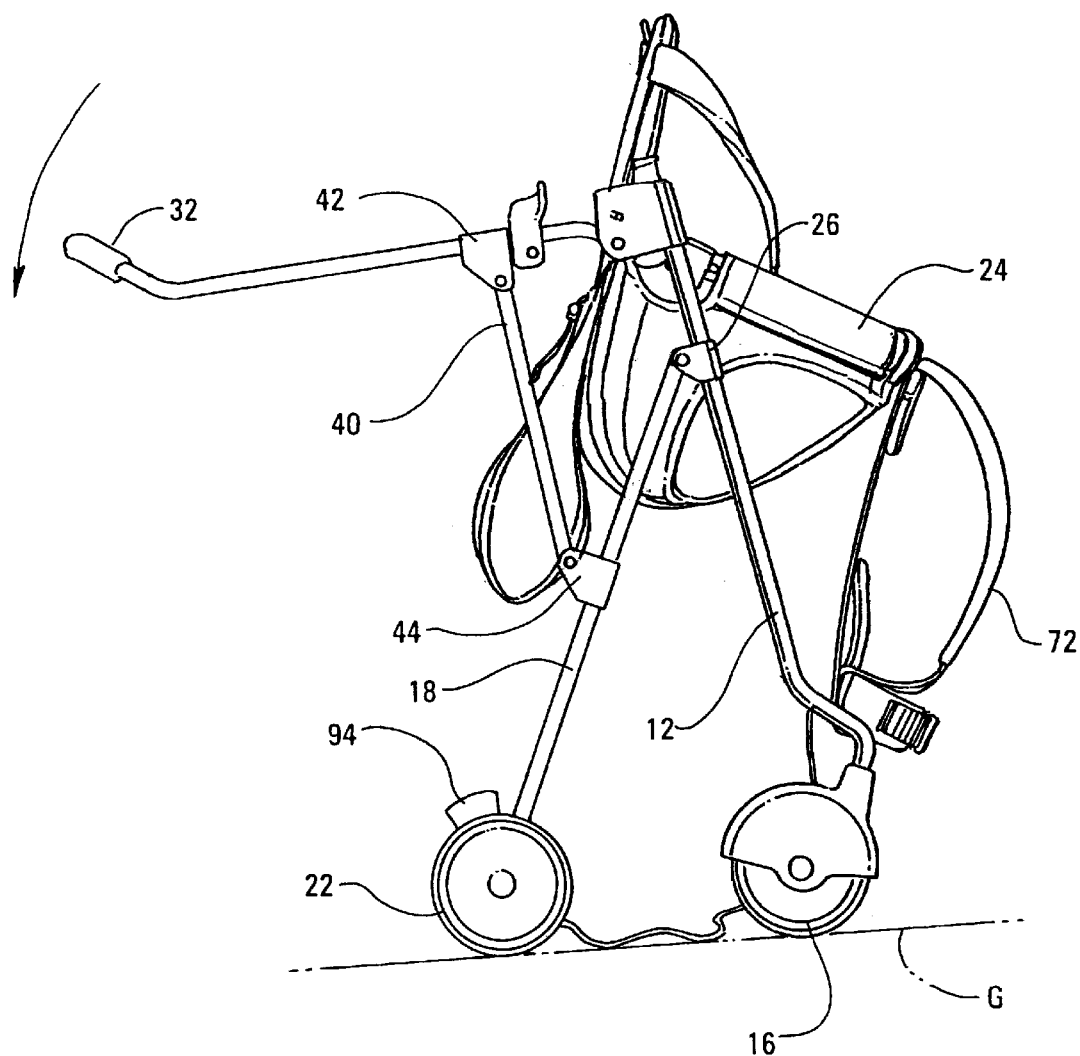

Conversion of the stroller/frame carrier 10 from the stroller configuration shown in FIG. 1 to the frame carrier configuration shown in FIG. 9 is illustrated by FIGS. 7–9. First, the operator grips the handle portion 28 at the grip 32 and swings the handle portion 28 downwardly to the position illustrated in FIG. 7. At this point, the detent 100 may engage the frame member 30 to hold the stroller/frame carrier in the partially collapsed position shown in FIG. 7. The operator may now place the stroller/frame carrier 10 on his back and reach behind it to grip the handle portion 28 and continue the conversion, or simply leave the stroller/frame carrier 10 on the ground G and continue.

Continued downward and forward motion of the handle portion 28 as shown by the arrow in FIG. 8 forces the activating strut 40 against the rear frame portion 18, causing the rear end 20 to move toward the front end 14 as the wheels 22 move along the ground G.

As shown in FIG. 9, continued forward and downward motion of the handle portion 28 completes the conversion, as the activating strut 40 pivots at the activating strut/rear frame pivot point 44 to lie adjacent to the rear frame portion 18.

As seen in FIG. 9, all four wheels 16, 16, 22, 22 preferably may remain on the ground even while the device 10 is in the frame carrier configuration, so it is self-supporting.

The stroller/frame carrier 10 may now be placed on the person's back with the child securely held in the child holder 24.

Once a point is reached where the stroller configuration is again desired, the device 10 may be placed on the ground in the configuration shown in FIG. 9 and the handle portion 28 may be moved backwardly and upwardly, reversing the sequence shown in FIGS. 7–9 and restoring the device 10 to the stroller configuration.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A folding child stroller and frame carrier convertible by using only one hand between use as a ground-contacting four-wheel stroller and use as a frame carrier for carrying a child on a person's back, comprising:
   (a) a front frame portion having a front end supporting at least two front wheels;
   (b) a rear frame portion having a rear end supporting at least two rear wheels;
   (c) a flexible child holder attached to the front frame portion;
   (d) the rear frame portion pivotally connected to the front frame portion at a pivot point and movable between an extended position in which the rear end is substantially separated from the front end and a contracted position in which the rear end is adjacent the front end;
   (e) a handle portion connected to the front frame portion and having a collapsed position pivotable downwardly and forwardly from an extended position in which the handle portion is substantially in-line with the front frame portion and a folded position in which the handle portion is adjacent to the rear frame portion; and
   a one-piece, non-folding actuating strut exerting a force on the rear frame portion at a point intermediate the rear end and the pivot point to move the rear end toward the front end with the rear wheels remaining on the ground when the handle is in the collapsed position.

2. The folding child stroller and frame carrier of claim 1, further comprising a releasable locking means adapted to secure the folding child stroller and frame carrier in the extended position for use as a stroller.

3. The folding child stroller and frame carrier of claim 1, wherein the child holder further comprises a back rest.

4. The folding child stroller and frame carrier of claim 3, wherein the child holder further comprises a harness adapted to secure the child to the child holder.

5. The folding child stroller and frame carrier of claim 4, further comprising a detachable rain/sun shield attached to the child holder.

6. The folding child stroller and frame carrier of claim 1, wherein the frame carrier further comprises a breathable, mesh back pad secured to the child holder and the front end.

7. The folding child stroller and frame carrier of claim 6, wherein the frame carrier further comprises two padded, adjustable shoulder straps secured between the child holder and the front end.

8. The folding child stroller and frame carrier of claim 7, further comprising an adjustable sternum strap adapted to connect the two shoulder straps together across the person's chest, and a sternum strap retainer holding the sternum strap to the shoulder straps, the sternum strap retainer being vertically adjustable along the shoulder strap.

9. The folding child stroller of claim 6, further comprising a lower back cushion attached to the back pad.

10. The folding child stroller and frame carrier of claim 9, further comprising a padded, adjustable waist belt attached to the lower back pad.

11. The folding child stroller and frame carrier of claim 1, wherein the child holder is adapted to be moved to a position substantially parallel to the front frame portion for permanent storage of the folding child stroller and frame carrier and further comprising a second releasable locking means adapted to hold the child holder substantially horizontal when the folding child stroller and frame carrier is in use.

12. The folding child stroller and frame carrier of claim 1, further comprising a storage pouch attached to the child holder.

13. The folding child stroller and frame carrier of claim 1, further comprising a detent adapted to hold the folding child stroller and frame carrier in a partially contracted position whereby a person may put the frame carrier on his back and then reach behind the child holder to pull the handle downwardly, thereby moving the folding child stroller and frame carrier to the contracted position.

14. The folding child stroller and frame carrier of claim 1, further comprising releasable rear wheel locks.

15. The folding child stroller and frame carrier of claim 1, wherein the child holder is attached to the front frame portion at an angle such that the child holder is canted slightly downwardly and forwardly when the folding child stroller and frame carrier is in the contracted position.

16. The folding child stroller and frame carrier of claim 1, further comprising a flexible brace connecting the rear end to the front end and adapted to limit the separation of the front end from the rear end.

17. A folding child stroller and frame carrier convertible by using only one hand between use as a ground-contacting four-wheel stroller and use as a frame carrier for carrying a child on a person's back, comprising:
   (a) a front frame portion having a front end supporting at least two front wheels;
   (b) a rear frame portion having a rear end supporting at least two rear wheels;
   (c) a flexible child holder attached to the front frame portion;
   (d) the rear frame portion pivotally connected to the front frame portion at a pivot point and movable between an extended position in which the rear end is substantially separated from the front end and a contracted position in which the rear end is adjacent the front end;
   (e) a handle portion connected to the front frame portion and pivotable downwardly and forwardly from an extended position in which the handle portion is substantially in-line with the front frame portion and a folded position in which the handle portion is adjacent to the rear frame portion;

(f) an actuating strut exerting a force on the rear frame portion at a point intermediate the rear end and the pivot point to move the rear end toward the front end as the handle portion is pivoted downwardly and forwardly, and the actuating strut attached to the handle portion at a fixed distance from the front frame portion and pivoting on the handle portion; and (g) a detent adapted to hold the folding child stroller and frame carrier in a partially contracted position whereby a person may put the frame carrier on his back and then reach behind the child holder to pull the handle portion downwardly, thereby moving the folding child stroller and frame carrier to the contracted position.

18. The folding child stroller and frame carrier of claim 17, further comprising a releasable locking means adapted to secure the folding child stroller and frame carrier in the extended position for use as a stroller.

19. The folding child stroller and frame carrier of claim 17, wherein the child holder further comprises a back rest.

20. The folding child stroller and frame carrier of claim 19, wherein the child holder further comprises a harness adapted to secure the child to the child holder.

21. The folding child stroller and frame carrier of claim 17, further comprising a detachable rain/sun shield attached to the child holder.

22. The folding child stroller and frame carrier of claim 17, wherein the frame carrier further comprises a breathable, mesh back pad secured to the child holder and the front end.

23. The folding child stroller and frame carrier of claim 22, wherein the frame carrier further comprises two padded, adjustable shoulder straps secured between the child holder and the front end.

24. The folding child stroller and frame carrier of claim 23, further comprising an adjustable sternum strap adapted to connect the two shoulder straps together across the person's chest, and a sternum strap retainer holding the sternum strap to the shoulder straps, the sternum strap retainer being vertically adjustable along the shoulder strap.

25. The folding child stroller of claim 22, further comprising a lower back cushion attached to the back pad.

26. The folding child stroller and frame carrier of claim 25, further comprising a padded, adjustable waist belt attached to the lower back pad.

27. The folding child stroller and frame carrier of claim 17, wherein the child holder is adapted to be moved to a position substantially parallel to the front frame portion for permanent storage of the folding child stroller and frame carrier and further comprising a second releasable locking means adapted to hold the child carrier substantially horizontal when the folding child stroller and frame carrier is in the upright, extended position.

28. The folding child stroller and frame carrier of claim 17, further comprising a storage pouch attached to the child holder.

29. The folding child stroller and frame carrier of claim 17, further comprising releasable rear wheel locks.

30. The folding child stroller and frame carrier of claim 17, wherein the child holder is attached to the front frame portion at an angle such that the child holder is canted slightly downwardly when the folding child stroller and frame carrier is in the contracted position.

31. The folding child stroller and frame carrier of claim 17, further comprising a flexible brace connecting the rear end to the front end and adapted to limit the separation of the front end from the rear end.

32. A folding child stroller and frame carrier convertible by using only one hand between use as a ground-contacting four-wheel stroller and use as a frame carrier for carrying a child on a person's back, comprising:

(a) a front frame portion having a front end supporting at least two front wheels;

(b) a rear frame portion having a rear end supporting at least two rear wheels;

(c) a flexible child holder attached to the front frame portion;

(d) the rear frame portion pivotally connected to the front frame portion at a pivot point and movable between an extended position in which the rear end is substantially separated from the front end and a contracted position in which the rear end is adjacent the front end;

(e) a handle portion connected to the front frame portion and pivotable downwardly and forwardly from an extended position in which the handle portion is substantially in-line with the front frame portion and a folded position in which the handle portion is adjacent to the rear frame portion;

(f) an actuating strut exerting a force on the rear frame portion at a point intermediate the rear end and the pivot point to move the rear end toward the front end as the handle is pivoted downwardly and forwardly, and the actuating strut attached to the handle portion at a fixed distance from the front frame portion and pivoting on the handle portion; and (g) wherein the child holder is adapted to be moved to a position substantially parallel to the front frame portion for permanent storage of the folding child stroller and frame carrier and further comprising a second releasable locking means adapted to hold the child carrier substantially horizontal when the folding child stroller and frame carrier is in the upright, extended position.

33. The folding child stroller and frame carrier of claim 32, further comprising a releasable locking means adapted to secure the folding child stroller and frame carrier in the extended position for use as a stroller.

34. The folding child stroller and frame carrier of claim 32, wherein the child holder further comprises a back rest.

35. The folding child stroller and frame carrier of claim 34, wherein the child holder further comprises a harness adapted to secure the child to the child holder.

36. The folding child stroller and frame carrier of claim 32, further comprising a detachable rain/sun shield attached to the child holder.

37. The folding child stroller and frame carrier of claim 32, wherein the frame carrier further comprises a breathable, mesh back pad secured to the child holder and the front end.

38. The folding child stroller and frame carrier of claim 32, wherein the frame carrier further comprises two padded, adjustable shoulder straps secured between the child holder and the front end.

39. The folding child stroller and frame carrier of claim 38, further comprising an adjustable sternum strap adapted to connect the two shoulder straps together across the person's chest, and a sternum strap retainer holding the sternum strap to the shoulder straps, the sternum strap retainer being vertically adjustable along the shoulder strap.

40. The folding child stroller of claim 37, further comprising a lower back cushion attached to the back pad.

41. The folding child stroller and frame carrier of claim 37, further comprising a padded, adjustable waist belt attached to the lower back pad.

42. The folding child stroller and frame carrier of claim 32, further comprising a storage pouch attached to the child holder.

43. The folding child stroller and frame carrier of claim 32, further comprising releasable rear wheel locks.

44. The folding child stroller and frame carrier of claim 32, wherein the child holder is attached to the front frame portion at an angle such that the child holder is canted slightly downwardly when the folding child stroller and frame carrier is in the contracted position.

45. The folding child stroller and frame carrier of claim 32, further comprising a flexible brace connecting the rear end to the front end and adapted to limit the separation of the front end from the rear end.

* * * * *

UNITED STATES PATENT AND TRADEMARK OFFICE
CERTIFICATE OF CORRECTION

PATENT NO. : 6,155,579
DATED : December 5, 2000
INVENTOR(S) : David W. Eyman, et al It is certified that error appears in the above-identified patent and that said Letters Patent is hereby corrected as shown below:

<u>Column 3,</u>
Line 31, please delete "28" and insert in its place -- 18 --.

<u>Column 5,</u>
Line 52, before the first occurrence of "a", please insert -- (f) --.

Signed and Sealed this

Thirteenth Day of November, 2001

*Attest:*

*Attesting Officer*

NICHOLAS P. GODICI
*Acting Director of the United States Patent and Trademark Office*